United States Patent
Grajeda et al.

(10) Patent No.: US 10,612,684 B2
(45) Date of Patent: Apr. 7, 2020

(54) ELECTROMAGNETIC VALVE ASSEMBLY

(71) Applicant: BWI (Shanghai) Co., Ltd., Shanghai (CN)

(72) Inventors: Yinko I. Grajeda, Bellbrook, OH (US); Jose R. Cano, Centerville, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/963,084

(22) Filed: Apr. 25, 2018

(65) Prior Publication Data

US 2018/0363799 A1 Dec. 20, 2018

Related U.S. Application Data

(60) Provisional application No. 62/519,646, filed on Jun. 14, 2017.

(51) Int. Cl.
*F16K 31/02* (2006.01)
*F16K 31/06* (2006.01)
(Continued)

(52) U.S. Cl.
CPC .......... *F16K 31/0665* (2013.01); *B60T 8/363* (2013.01); *B60T 8/3675* (2013.01);
(Continued)

(58) Field of Classification Search
USPC ..................... 251/129.02, 129.15; 303/119.2
See application file for complete search history.

(56) References Cited

U.S. PATENT DOCUMENTS 6,644,623 B1 * 11/2003 Voss ........................ B60T 8/363
251/129.01
6,846,049 B2  1/2005 Obersteiner et al.
(Continued)

FOREIGN PATENT DOCUMENTS

CN     1483119 A    3/2004
CN   101541604 A    9/2009
(Continued)

OTHER PUBLICATIONS

First Office Action and search report dated May 5, 2019 for counterpart Chinese patent application No. 201810500200.1, along with English translation.
(Continued)

*Primary Examiner* — Robert K Arundale
(74) *Attorney, Agent, or Firm* — William H. Honaker; Dickinson Wright PLLC

(57) ABSTRACT

An electromagnetic valve assembly including a magnetic core defining a channel. A valve seat is received by the channel and defines a compartment. An outflow chamber is defined between the magnetic core and the valve seat. The valve seat defines an orifice that fluidly connects the compartment of the valve seat and the outflow chamber. A tappet is axially moveable to open and close the orifice. The valve seat further defines a check valve orifice fluidly connecting the compartment of the valve seat and the outflow chamber. A ball overlies the check valve orifice. A filter seat is secured to said valve seat. A ball guide is disposed in alignment with the check valve orifice and defines a guide passage that receives the ball for guiding the ball toward and away from said check valve orifice. The guide passage is defined by the valve seat and the filter seat.

17 Claims, 3 Drawing Sheets

(51) Int. Cl.
 *B60T 8/36* (2006.01)
 *F16K 15/18* (2006.01)
 *F16K 27/02* (2006.01)

(52) U.S. Cl.
 CPC .......... *F16K 15/183* (2013.01); *F16K 27/029* (2013.01); *F16K 31/0658* (2013.01)

(56) References Cited

U.S. PATENT DOCUMENTS

| | | | |
|---|---|---|---|
| 7,832,707 B2 | 11/2010 | Shigeta et al. | |
| 7,862,130 B2 | 1/2011 | Lee | |
| 7,938,381 B2 | 5/2011 | Takahashi et al. | |
| 8,113,596 B2 | 2/2012 | Lee et al. | |
| 8,123,193 B2 | 2/2012 | Kratzer | |
| 8,641,153 B2 * | 2/2014 | Voss | B60T 8/363 137/269 |
| 8,936,230 B2 | 1/2015 | Takamatsu et al. | |
| 2004/0041468 A1 * | 3/2004 | Obersteiner | B60T 8/363 303/119.2 |
| 2008/0185548 A1 * | 8/2008 | Takahashi | B60T 8/363 251/129.15 |
| 2008/0191156 A1 * | 8/2008 | Shigeta | B60T 8/363 251/129.02 |
| 2008/0197308 A1 * | 8/2008 | Guggenmos | B60T 8/363 251/129.02 |
| 2009/0121541 A1 * | 5/2009 | Lee | B60T 8/363 303/119.2 |
| 2010/0051839 A1 | 3/2010 | Guggenmos et al. | |
| 2010/0059698 A1 * | 3/2010 | Guggenmos | B60T 8/363 251/129.15 |
| 2012/0267555 A1 * | 10/2012 | Dinerman | B60T 8/3615 251/129.15 |
| 2014/0346855 A1 | 11/2014 | Sasaki et al. | |

FOREIGN PATENT DOCUMENTS

| | | |
|---|---|---|
| CN | 102177057 A | 9/2011 |
| CN | 102458938 A | 5/2012 |
| CN | 204372242 U | 6/2015 |

OTHER PUBLICATIONS

Second Office Action dated Oct. 23, 2019 for counterpart Chinese patent application No. 201810500200.1, along with machine EN translation.

* cited by examiner

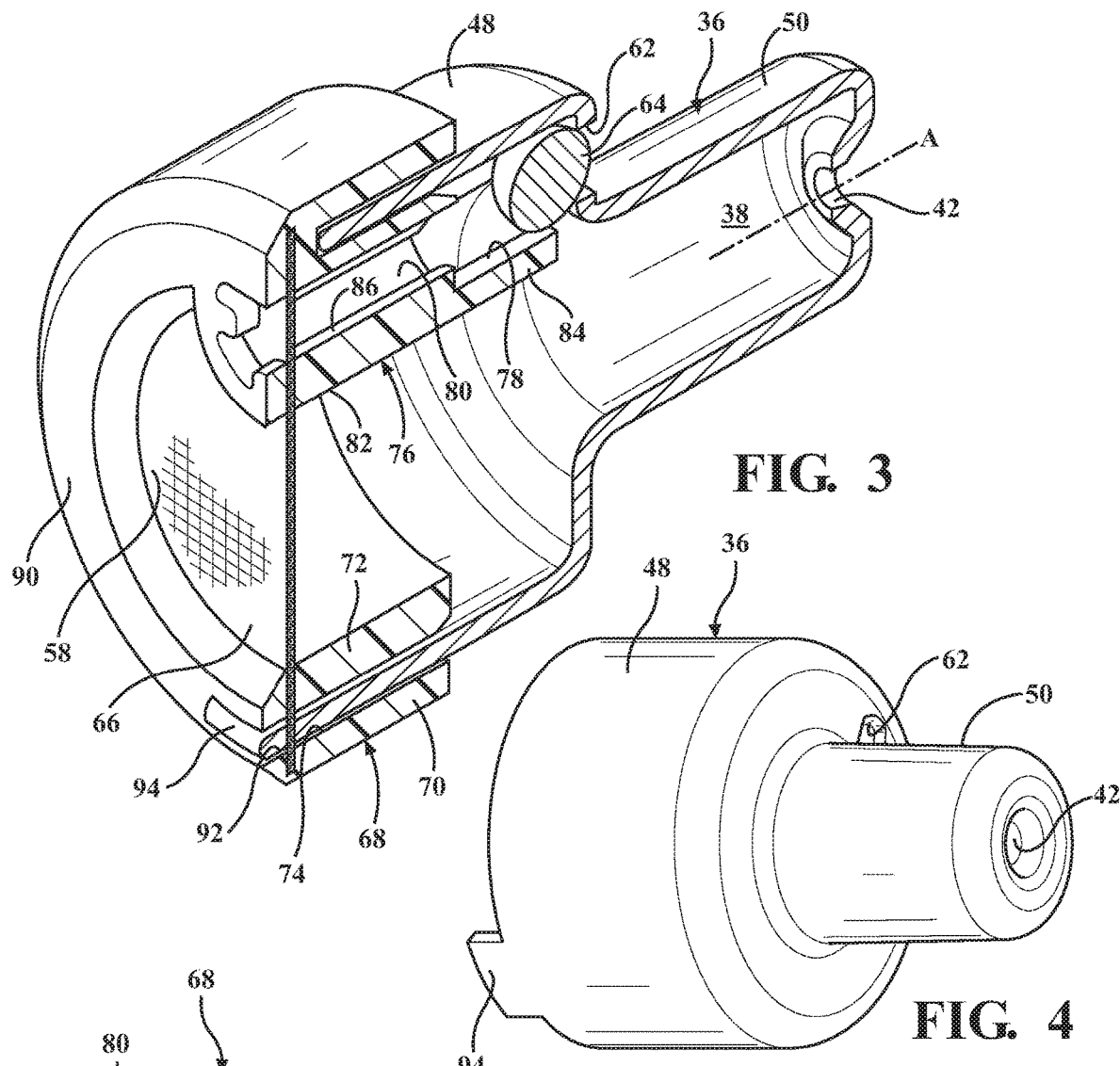
FIG. 3
FIG. 4
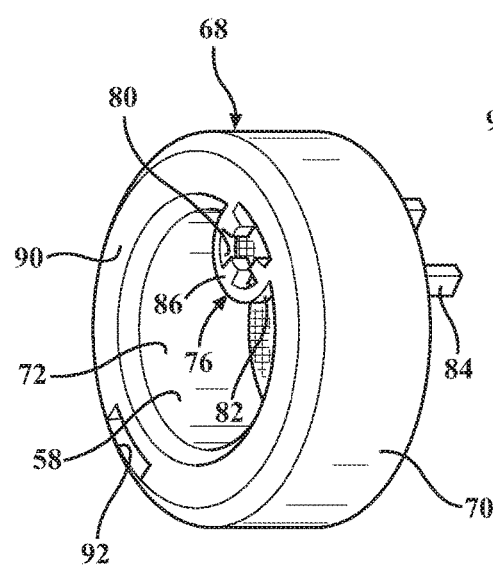
FIG. 5
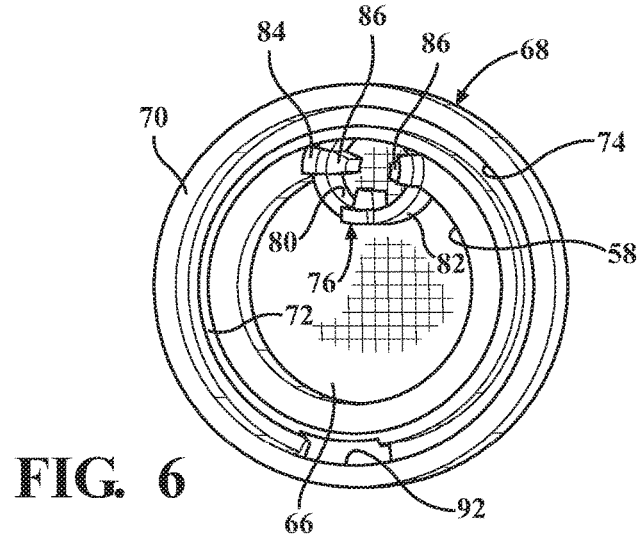
FIG. 6

ELECTROMAGNETIC VALVE ASSEMBLY

CROSS-REFERENCE TO RELATED APPLICATIONS

This application claims the benefit of U.S. Provisional Patent Application Ser. No. 62/519,646 filed on Jun. 14, 2017, and titled "Electromagnetic Valve Assembly," the entire disclosure of which is hereby incorporated by reference.

BACKGROUND OF THE INVENTION

1. Field of the Invention

An electromagnetic valve assembly for providing hydraulic pressure control for a vehicle system.

2. Description of the Prior Art

Electromagnetic valve assemblies are known in the art for providing hydraulic pressure control for vehicle systems such as antilock brake systems by controlling the hydraulic pressure acting on the wheel cylinders of wheel brakes.

FIG. 1 illustrates a conventional electromagnetic valve assembly 100. The valve assembly 100 includes a modulator block 102 that defines a bore 104 which is fluidly connected to a master cylinder. A magnetic core 106 is received by the bore 104. A valve seat 108 is received by a channel 110 of the magnetic core 106 and defines a compartment 112. An outflow chamber 114 is defined between the magnetic core 106 and the valve seat 108. An outlet 115 is fluidly connected to a brake assembly. The valve seat 108 defines an orifice 116 that fluidly connects the compartment 112 of the valve seat 108 and the outflow chamber 114. A tappet 118 is axially moveable to open and close the orifice 116 to fluidly connect and disconnect the compartment 112 of the valve seat 108 and the outflow chamber 114. An armature 120 and corresponding solenoid (not shown) provide movement of the tappet 118. A molded filter support 122 is connected to the valve seat 108 and defines a check valve passage 124. A ball 126 is disposed in the check valve passage 124 which allows fluid to flow out of the outflow chamber 114 to the master cylinder while preventing fluid from flowing into the outflow chamber 114 from the master cylinder.

There remains a need for improvements to such electromagnetic check valve assemblies.

SUMMARY OF THE INVENTION

An electromagnetic valve assembly is provided. The electromagnetic valve assembly includes a magnetic core extending about and along an axis and defining a channel. A valve seat is received by the channel of the magnetic core and defines a compartment. An outflow chamber is defined between the magnetic core and the valve seat. The valve seat defines an orifice that fluidly connects the compartment of the valve seat and the outflow chamber. A tappet is axially moveable to open and close the orifice to fluidly connect and disconnect the compartment of the valve seat and the outflow chamber. The valve seat further defines a check valve orifice that further fluidly connects the compartment of the valve seat and the outflow chamber. A ball overlies the check valve orifice and allows fluid to flow from the outflow chamber to the compartment of the valve seat through the check valve orifice while preventing fluid from flowing from the compartment of the valve seat to the outflow chamber through the check valve orifice. A filter seat is secured to the valve seat. A ball guide is disposed in alignment with the check valve orifice and defines a guide passage that receives the ball for guiding the ball toward and away from the check valve orifice. The guide passage is defined by the valve seat and the filter seat.

The invention in its broadest aspect therefore provides an electromagnetic valve assembly that is durable and not prone to leakage. More particularly, integrating the check valve orifice into the valve seat reduces the risk of wear at the check valve orifice over time since there are few components and the valve seat may be made of a durable material like a metal.

Furthermore, defining the guide passage by the valve seat and filter seat provides a simple and compact design of the guide passage which allows the electromagnetic valve assembly to easily be disassembled and reassembled into proper alignment as needed.

Furthermore, the overall design of the electromagnetic valve assembly is compact, simple in design, and easy and inexpensive to manufacture.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 3 is a perspective cross-sectional view of a valve seat and filter seat of the example embodiment of the electromagnetic valve assembly of FIG. 2;

FIG. 4 is a front perspective view of the valve seat of the electromagnetic valve assembly of FIG. 2;

FIG. 5 is a back perspective view of a filter seat of the electromagnetic valve assembly of FIG. 2; and FIG. 6 is a back perspective view of the filter seat of the electromagnetic valve assembly of FIG. 2.

DESCRIPTION OF THE ENABLING EMBODIMENT

Referring to FIGS. 2-6, wherein like numerals indicate corresponding parts throughout the several views, an electromagnetic valve assembly 20 is generally shown. The subject electromagnetic valve assembly 20 is configured to provide hydraulic pressure control for vehicle systems like an antilock brake system, traction control system, or an electronic stability program system by controlling the hydraulic pressure acting on the wheel cylinders of wheel brakes. It should be appreciated that the subject electromagnetic valve assembly 20 may be utilized on various types of vehicles including, but not limited to, automobiles and motorcycles.

Figure 1:
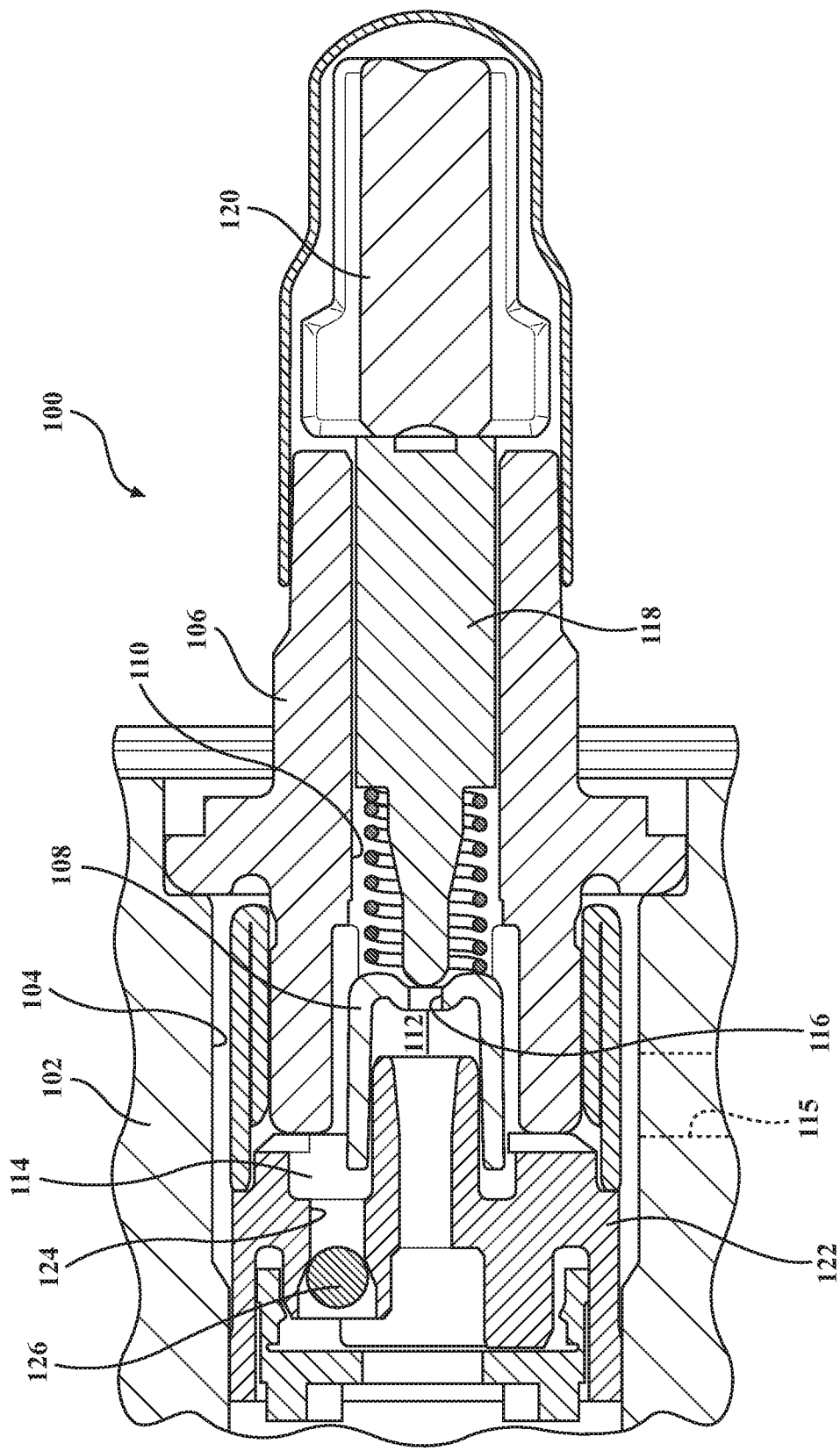
FIG. 1 is a side cross-sectional side view of a prior art electromagnetic valve assembly.
Figure 2:
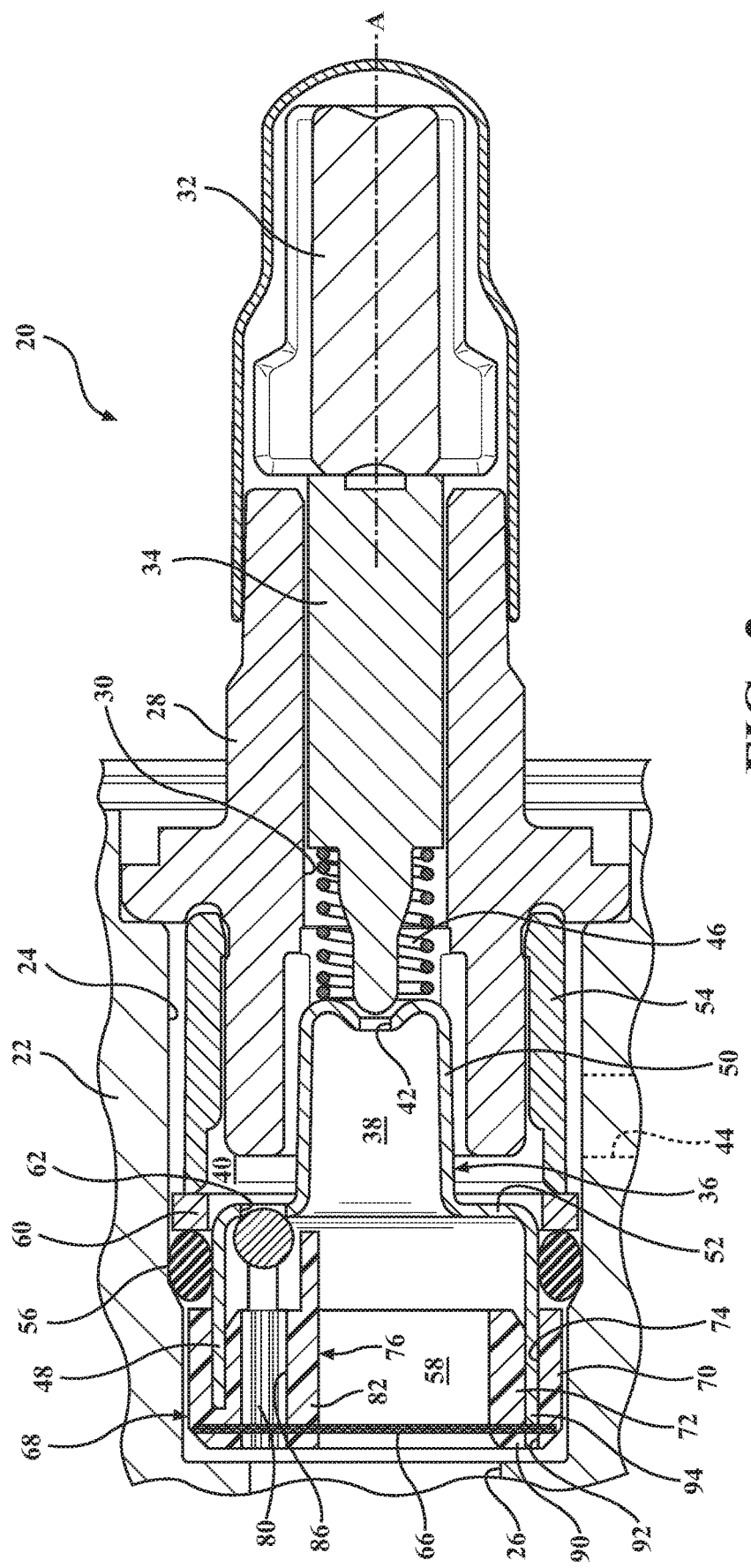
FIG. 2 is a side cross-sectional view of an example embodiment of an electromagnetic valves assembly according to an aspect of the disclosure.

As best illustrated in FIG. 2, the electromagnetic valve assembly 20 includes a modulator block 22 that defines a bore 24. The bore 24 is connected to an inner flow path 26 that is connected to a master cylinder. The bore 24 receives fluid from, and passes fluid to the master cylinder. A magnetic core 28 is received by the bore 24 and extends about and along a center axis A and defines a channel 30 that extends along the axis A. A tappet 34 is received by the channel 30 and is moveable along the axis A relative to the magnetic core 28 in response to movement provided by an armature 32 and associated solenoid (not shown).

A valve seat 36 is received by the channel 30 of the magnetic core 28 and defines a compartment 38 that is fluidly connected to the inner flow path 26. The valve seat 36 is preferably made of a robust material such as metal. An outflow chamber 40 is defined between the magnetic core 28 and the valve seat 36. The valve seat 36 further defines an orifice 42 along the axis A that fluidly connects the compartment 38 of the valve seat 36 and the outflow chamber 40. The modulator block 22 further defines at least one outlet 44 that is fluidly connected to the outflow chamber 40 and to a brake assembly for transmitting fluid therebetween.

The tappet 34 is aligned with the orifice 42 of the valve seat 36 and is axially moveable with the armature 32 to open and close the orifice 42 to fluidly connect and disconnect the compartment 38 of the valve seat 36 and the outflow chamber 40. A spring 46 extends between the valve seat 36 and the tappet 34 and axially biases the tappet 34 away from the valve seat 36.

The valve seat 36 has a generally tube shaped rim portion 48 and a generally tube shaped extension portion 50 that extends axially away from the rim portion 48. The extension portion 50 has a smaller diameter than the rim portion 48. A shoulder 52 extends radially and interconnects the rim portion 48 and the extension portion 50. The extension portion 50 defines the orifice 42. It should be appreciated that the rim portion 48 and extension portion 50 could have other cross-sectional shapes.

A band filter 54 is disposed radially between the magnetic core 28 and the modulator block 22 for filtering fluid passing between the outflow chamber 40 and the outlet 44. Further, an o-ring 56 is positioned radially between the rim portion 48 of the valve seat 36 and the modulator block 22 for preventing the passage of fluid therebetween. A backup ring 60 is positioned axially between the o-ring 56 and the band filter 54 for axially fixing the o-ring 56 and the band filter 54 in place.

The shoulder 52 of the valve seat 36 defines a check valve orifice 62 that fluidly connects the compartment 38 of the valve seat 36 and the outflow chamber 40. In the example embodiment, the shoulder 52 of the valve seat 36 is comprised of a thin sheet of material as compared to the material that defines the check valve orifices of conventional valve assemblies 20 to allow the check valve orifice 62 to easily be punched therethrough. A ball 64 overlies the check valve orifice 62 to allow fluid to flow from the outflow chamber 40 to the compartment 38 of the valve seat 36 through the check valve orifice 62, and prevents fluid from flowing from the compartment 38 of the valve seat 36 to the outflow chamber 40 through the check valve orifice 62.

It should be appreciated that using the deep drawn valve seat 36 to define the check valve orifice 62 advantageously provides improved initial performance and extended durability of the electromagnetic valve assembly 20 due to the metal ball 64 to metal valve seat 36 interface as compared to conventional electromagnetic valve assemblies 20 which typically utilized a plastic filter support to define the check valve orifice 62. The subject arrangement also advantageously reduces the risk of leaks forming at the check valve orifice 62. Furthermore, the deep drawn valve seat 36 is used to define a valve air gap such as between the armature 32 and tappet 34, thus maintaining an energized air gap setting sequence.

A filter seat 68 is secured to the rim portion 48 of the valve seat 36. The filter seat 68 includes a generally tube-shaped outer wall 70 and a generally tube-shaped inner wall 72 disposed radially inwardly from the outer wall 70 to define a slot 74 between the inner and outer walls 72, 70, and to define a passage 58 radially inwardly from the inner wall 72. It should be appreciated that the outer and inner walls 70, 72 could have other shapes. A filter 66 extends perpendicularly to the axis A across the passage 58 of the filter seat 68 for filtering fluids between the passage 58 and the inner-flow path.

A ball guide 76 is disposed in alignment with the check valve orifice 62. The ball guide 76 defines a guide passage 78 that receives the ball 64 and extends axially for guiding the ball 64 axially toward and away from the check valve orifice 62. The guide passage 78 extends axially along a length that is greater than a diameter of the ball 64 such that the ball may move axially within the guide passage 78. As best illustrated in FIGS. 2 and 3, the guide passage 78 is partially defined by an inner surface of the rim portion 48 of the valve seat 36 and by a guidance wall 80 that is defined by the filter seat 68. As best illustrated in FIGS. 3, 5 and 6, the guidance wall 80 is arc-shaped, and protrudes radially inwardly from the inner wall 72 of the filter seat 68. The ball guide 76 also includes a partial-cylinder shaped portion 82 and a plurality of alignment members 84 that extend axially from the partial-cylinder shaped portion 82 generally toward the check valve orifice 62. The alignment members 84 are evenly spaced from one another along the guidance wall 80. Since the alignment members 84 are spaced form one another, the guide passage 78 is fluidly connected to the compartment 38 of the valve seat 36.

The ball guide 76 also includes at least one stopping element 86 that limits axial movement of the ball 64 away from the check valve orifice 62. In the example embodiment, the stopping element 86 includes a plurality of ribs 86 that extend inwardly from the partial-cylinder shaped portion 82 of the guidance wall 80. Each of the ribs 86 are evenly spaced from one another and in axial alignment with one of the alignment members 84 to provide for simple manufacturing of the ball guide 76.

As best illustrated in FIGS. 2 and 3, the rim portion 48 of the valve seat 36 is received by the slot 74 of the filter seat 68. The filter seat 68 is secured to an end of the rim portion 48 of the valve seat 36. The filter seat 68 further includes a base 90 between the inner and outer walls 72, 70. The base 90 defines an axial opening 92. A tab 94 extends axially from a terminal end of the rim portion 48 of the valve seat 36 into the opening for properly circumferentially aligning the valve seat 36 relative to the filter seat 68 to ensure that the ball guide 76 is properly aligned with the check valve orifice 62. It should be appreciated that any number of axial openings 92 and corresponding tabs 94 could be utilized.

It should be appreciated that the design of the ball guide 76 and interface between the valve seat 36 and filter seat 68 make the electromagnetic valve assembly 20 compact, simple in design, inexpensive and easy to manufacture, and easy to disassemble and reassemble as needed.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An electromagnetic valve assembly, including;
a magnetic core extending about and along an axis and defining a channel;
a valve seat received by said channel of said magnetic core and defining a compartment;
an outflow chamber defined between said magnetic core and said valve seat;
said valve seat defining an orifice fluidly connecting said compartment of said valve seat and said outflow chamber;
a tappet axially moveable to open and close said orifice to fluidly connect and disconnect said compartment of said valve seat and said outflow chamber;
said valve seat further defining a check valve orifice fluidly connecting said compartment of said valve seat and said outflow chamber;
a ball overlying said check valve orifice allowing fluid to flow from said outflow chamber to said compartment of said valve seat through said check valve orifice and preventing fluid from flowing from said compartment of said valve seat to said outflow chamber through said check valve orifice;
a filter seat secured to said valve seat; and
a ball guide in alignment with said check valve orifice and defining a guide passage receiving said ball for guiding said ball toward and away from said check valve orifice, wherein said guide passage is defined by said valve seat and said filter seat,
wherein said valve seat includes a rim portion extending axially, and said guide passage is partially defined by said rim portion of said valve seat,
wherein said ball guide includes a guidance wall being generally arc-shaped protruding radially inwardly from said inner wall of said filter seat,
wherein said guidance wall includes a partial-cylinder shaped portion and a plurality of alignment members extending axially from said partial-cylinder shaped portion generally toward said check valve orifice.

2. The electromagnetic valve assembly as set forth in claim 1 wherein said guide passage extends axially along a length that is greater than a diameter of the ball for guiding said ball axially toward and way from said check valve orifice.

3. The electromagnetic valve assembly as set forth in claim 2 wherein said ball guide includes at least one stopping element positioned in axial alignment with said ball in said guide passage for limiting axial movement of said ball away from said check valve orifice.

4. The electromagnetic valve assembly as set forth in claim 1 wherein said filter seat includes an outer wall and an inner wall disposed radially inwardly from said outer wall to define a slot between said inner and outer walls and to define a passage inwardly from said inner wall, and wherein said rim portion is received by said slot of said of said filter seat.

5. The electromagnetic valve assembly as set forth in claim 1 wherein said alignment members are evenly spaced from one another along said guidance wall.

6. The electromagnetic valve assembly as set forth in claim 1 wherein said ball guide includes at least one stopping element limiting axial movement of said ball away from said check valve orifice, and wherein said stopping element includes a plurality of ribs extending inwardly from said guidance wall.

7. The electromagnetic valve assembly as set forth in claim 6 wherein said plurality of ribs are evenly spaced from one another.

8. The electromagnetic valve assembly as set forth in claim 4 wherein said filter seat further includes a base between said inner and outer walls; said base defines an axial opening; and wherein a tab extends axially from said rim portion into said axial opening for circumferentially aligning said valve seat relative to said filter seat.

9. The electromagnetic valve assembly as set forth in claim 4 wherein said valve seat further includes an extension portion being generally tube shaped and extending axially away from said rim portion, wherein said valve seat defines a shoulder between said extension portion and said rim portion of said valve seat, and wherein said check valve orifice is defined axially into said shoulder.

10. The electromagnetic valve assembly as set forth in claim 9 wherein a filter extends across said passage of said filter seat for filtering fluids passing through said passage.

11. The electromagnetic valve assembly as set forth in claim 9 further including a modulator block defining a bore receiving said magnetic core and said valve seat and said filter seat; said modulator block defining an inner flow path fluidly connected to said passage of said filter seat and said compartment of said valve seat; and said modulator block defining an outlet fluidly connected to said outflow chamber for receiving and passing fluid to a brake assembly.

12. The electromagnetic valve assembly as set forth in claim 11 further including a band filter disposed in said outflow chamber over said outlet for filtering fluid passing through said outlet.

13. The electromagnetic valve assembly as set forth in claim 12 further including an o-ring disposed radially between said valve seat and said modulator block for preventing fluid from passing between said modulator block and said valve seat.

14. The electromagnetic valve assembly as set forth in claim 13 further including a backup ring disposed axially between said band filter and said o-ring for axially fixing said o-ring and said band filter in place.

15. The electromagnetic valve assembly as set forth in claim 1 wherein said guide passage is fluidly connected with said compartment of said valve seat.

16. An electromagnetic valve assembly, including;
a magnetic core extending about and along an axis and defining a channel;
a valve seat received by said channel of said magnetic core and defining a compartment;
an outflow chamber defined between said magnetic core and said valve seat;
said valve seat defining an orifice fluidly connecting said compartment of said valve seat and said outflow chamber;
a tappet axially moveable to open and close said orifice to fluidly connect and disconnect said compartment of said valve seat and said outflow chamber;
said valve seat further defining a check valve orifice fluidly connecting said compartment of said valve seat and said outflow chamber;
a ball overlying said check valve orifice allowing fluid to flow from said outflow chamber to said compartment of said valve seat through said check valve orifice and preventing fluid from flowing from said compartment of said valve seat to said outflow chamber through said check valve orifice;
a filter seat secured to said valve seat; and
a ball guide in alignment with said check valve orifice and defining a guide passage receiving said ball for guiding said ball toward and away from said check valve orifice, wherein said guide passage is defined by said valve seat and said filter seat,
wherein said filter seat includes an outer wall and an inner wall disposed radially inwardly from said outer wall to define a slot between said inner and outer walls and to define a passage inwardly from said inner wall, and wherein said valve seat includes a rim portion extending axially and received by said slot of said of said filter seat,
wherein said filter seat further includes a base between said inner and outer walls;
said base defines an axial opening; and wherein a tab extends axially from said rim portion into said axial opening for circumferentially aligning said valve seat relative to said filter seat.

17. An electromagnetic valve assembly, including;
a magnetic core extending about and along an axis and defining a channel;
a valve seat received by said channel of said magnetic core and defining a compartment;
an outflow chamber defined between said magnetic core and said valve seat;
said valve seat defining an orifice fluidly connecting said compartment of said valve seat and said outflow chamber;
a tappet axially moveable to open and close said orifice to fluidly connect and disconnect said compartment of said valve seat and said outflow chamber;
said valve seat further defining a check valve orifice fluidly connecting said compartment of said valve seat and said outflow chamber;
a ball overlying said check valve orifice allowing fluid to flow from said outflow chamber to said compartment of said valve seat through said check valve orifice and preventing fluid from flowing from said compartment of said valve seat to said outflow chamber through said check valve orifice;
a filter seat secured to said valve seat;
a ball guide in alignment with said check valve orifice and defining a guide passage receiving said ball for guiding said ball toward and away from said check valve orifice, wherein said guide passage is defined by said valve seat and said filter seat;
said filter seat including an outer wall and an inner wall disposed radially inwardly from said outer wall to define a slot between said inner and outer walls and to define a passage inwardly from said inner wall, and wherein said valve seat includes a rim portion extending axially and received by said slot of said of said filter seat;
said valve seat further including an extension portion being generally tube shaped and extending axially away from said rim portion, wherein said valve seat defines a shoulder between said extension portion and said rim portion of said valve seat, and wherein said check valve orifice is defined axially into said shoulder;
a modulator block defining a bore receiving said magnetic core and said valve seat and said filter seat, said modulator block defining an inner flow path fluidly connected to said passage of said filter seat and said compartment of said valve seat, and said modulator block defining an outlet fluidly connected to said outflow chamber for receiving and passing fluid to a brake assembly;
a band filter disposed in said outflow chamber over said outlet for filtering fluid passing through said outlet;
an o-ring disposed radially between said valve seat and said modulator block for preventing fluid from passing between said modulator block and said valve seat; and
a backup ring disposed axially between said band filter and said o-ring for axially fixing said o-ring and said band filter in place.

* * * * *